United States Patent [19]

Mehnert

[11] 4,204,826
[45] May 27, 1980

[54] BLOW MOLDING APPARATUS

[76] Inventor: Johannes Mehnert, Ernststrasse 11, 5203 St. Augustin-Menden, Fed. Rep. of Germany

[21] Appl. No.: 881,185

[22] Filed: Feb. 27, 1978

Related U.S. Application Data

[60] Continuation of Ser. No. 761,362, Jan. 21, 1977, abandoned, which is a continuation of Ser. No. 647,964, Jan. 9, 1975, abandoned, which is a division of Ser. No. 498,362, Aug. 19, 1974, Pat. No. 3,947,197.

[30] Foreign Application Priority Data

Aug. 21, 1973 [DE] Fed. Rep. of Germany ....... 2342134

[51] Int. Cl.$^2$ .............................................. B29C 17/07
[52] U.S. Cl. .................................... 425/525; 264/539; 264/542; 425/531; 425/532; 425/534
[58] Field of Search ...................... 264/89, 94, 97–99, 264/539–543; 425/525, 526, 531, 532, 534, 530, 529

[56] References Cited

U.S. PATENT DOCUMENTS

| | | | |
|---|---|---|---|
| 2,290,129 | 7/1942 | Moreland et al. | 425/526 X |
| 3,728,063 | 4/1973 | Langecker | 425/524 |
| 3,751,207 | 8/1973 | Mehnert | 425/535 X |
| 3,785,116 | 1/1974 | Munz et al. | 425/524 X |
| 3,816,580 | 6/1974 | Valyi | 264/327 X |
| 3,825,389 | 7/1974 | Pott | 425/381 X |
| 3,910,746 | 10/1975 | Mrusek et al. | 425/526 |

Primary Examiner—Jan H. Silbaugh
Attorney, Agent, or Firm—Norman S. Blodgett; Gerry A. Blodgett

[57] ABSTRACT

Apparatus for blow molding consisting of a preform station where a blank is shaped around a mandrel and a blow station where the blank is formed in a mold, the mandrel being removed from the blank and a compressed air member being applied to the orifice of the blank.

3 Claims, 13 Drawing Figures

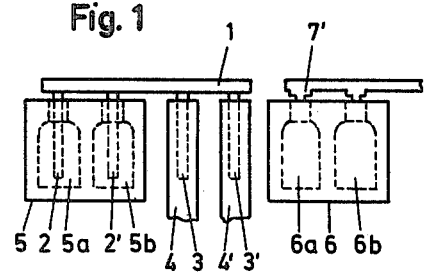
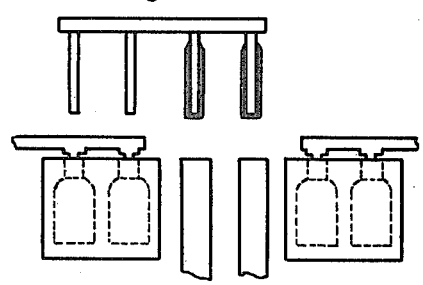
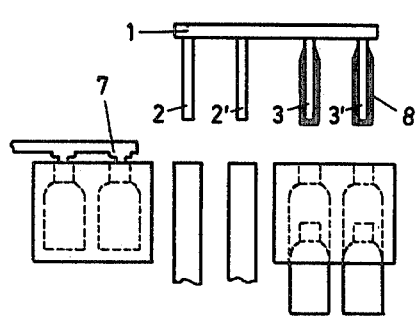
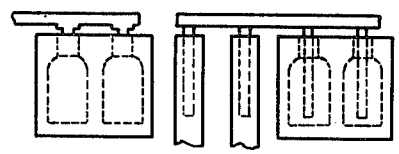

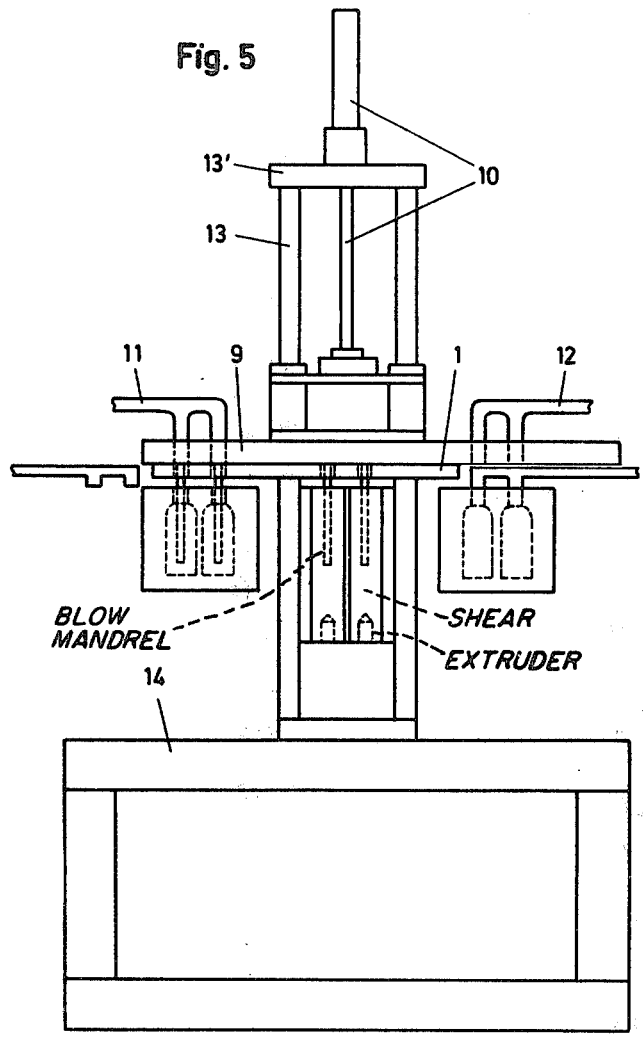

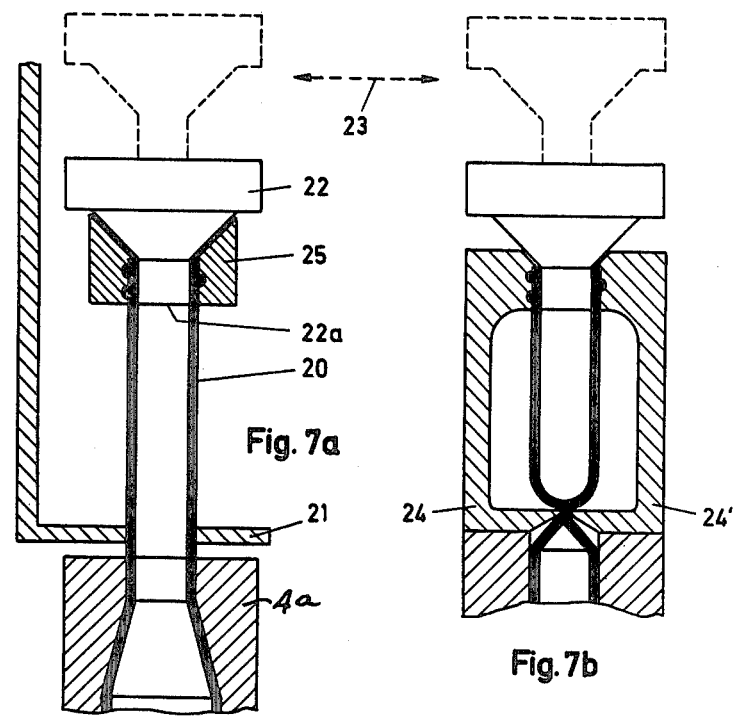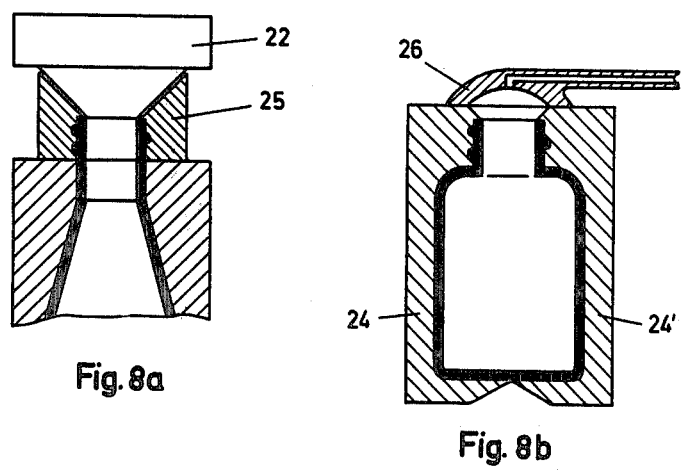

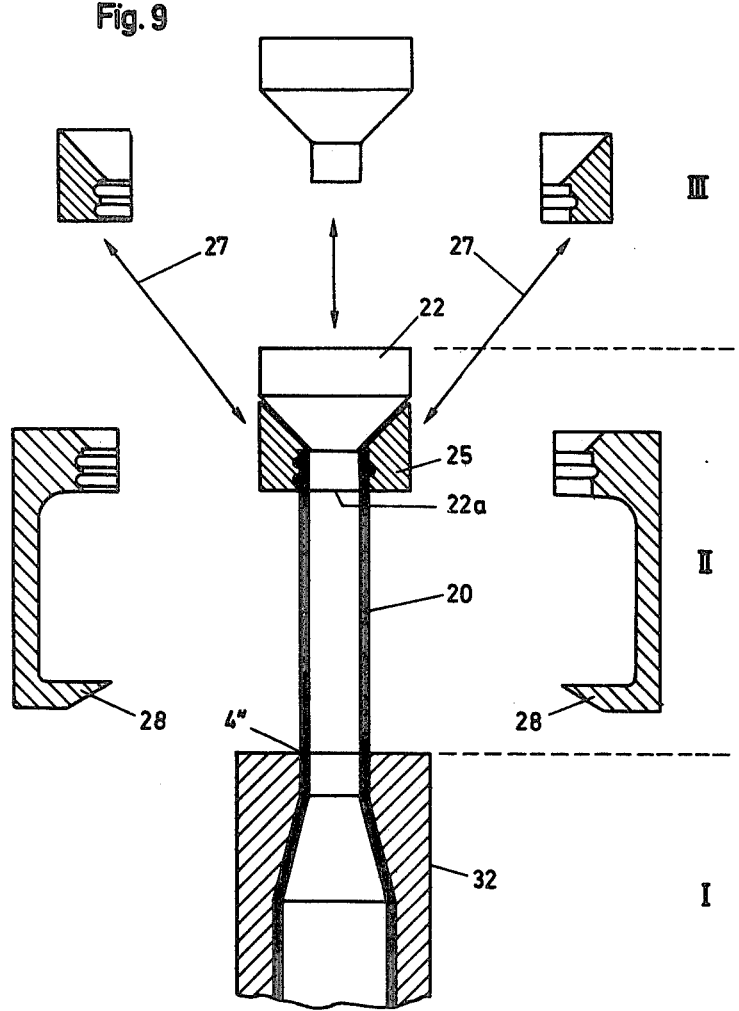

BLOW MOLDING APPARATUS

This is a continuation, of application Ser. No. 761,362 filed Jan. 21, 1977, now abandoned, which is a continuation of application Ser. No. 647,964 filed Jan. 9, 1975, now abandoned, which in turn is a division of patent application Ser. No. 498,362 filed Aug. 19, 1974, now U.S. Pat. No. 3,947,197.

BACKGROUND OF THE INVENTION

A German published patent application No. 2,208,165 teaches a method for manufacturing hollow on bodies out of theremosplastic materials. In a preforming station a blank is shaped around a blow mandrel, the blank with the blow mandrel is transferred to a blow station and therein is expanded in a divided blow mold by means of compressed air, is cooled, is solidified, and is removed from the blow mold. The blow mandrel is removed from the inflated hollow article prior to conclusion of the cooling by a relative motion between the blow mandrel and blow mold and immediately another conventional member feeding compressed air is brought to the opening in the hollow body for additional cooling.

The apparatus for performing this method consists of a preforming station, a blow station with a divided blow mold arranged at some distance from it, and a blow mandrel which can be moved back and forth between the preforming station and the blow station; it also includes equipment for the blowing and cooling of the hollow body. The blow mandrel and the other organs, which deliver compressed air in a similar manner, are arranged on a common guideway. These and other difficulties experienced with the prior art devices have been obviated in a novel manner by the present invention.

It is, therefore, an outstanding object of the invention to simplify this known apparatus and to so develop it that the blow mandrel and the other compressed-air-feeding member execute only translational motions and take up a particularly well-defined spatial relationship to the different work stations.

With these and other objects in view, as will be apparent to those skilled in the art, the invention resides in the combination of parts set forth in the specification and covered by the claims appended hereto.

SUMMARY OF THE INVENTION

According to one embodiment of the invention, the function is obtained by arranging the blow mandrel on a beam that can be raised and lowered (as well as moved laterally perpendicular to the direction of the extension of the blow mandrel) in order that it may be moved from a preforming station to at least one blow station. It cooperates with other compressed-air-feeding members which may be pushed onto or into the opening in the hollow article in the blow mold associated with the blow station after the blow mandrel has been lifted out.

The above-described embodiment may be further modified by providing at least two sets of blow mandrels which lie side-by-side and are rigidly connected with one another through the movable beam longitudinally of the beam. The blow mandrel sets alternately interact with a central preforming station and with each one of two blow stations arranged on either side of the central preforming station. At the same time each one of the two blow mandrel sets is arranged to be movable into the preforming station and the other set of blow mandrels is movable into each one of the two blow stations. There is provided at least one compressed-air-feeding member that displays a number of exhaust compressed-air ports corresponding to the number of blow mandrels, which member can be moved over or into the openings into the mold cavities after a blow mandrel set has been removed from one of the blow stations.

The beam connecting the two blow mandrel sets is preferably constructed as a sliding carriage, which is set into a counter-support which is mounted for raising and lowering relative to the machine frame, whereby the counter-support is arranged in a bar that is mounted on the machine frame by means of two vertical columns.

Each blow mandrel set has at least one blow mandrel, the blow mandrel sets may also consist of three or four, but preferably two blow mandrels. The number of blow mandrels per blow mandrel set corresponds to the number of exhaust ports of the compressed-air-feeding members; the same applies with regard to the number of mold cavities, which is identical with the number of blow mandrels per blow mandrel set. Preferably, two compressed-air-feeding members are provided for producing the holding pressure after removal of the blow mandrel sets, whereby one interacts with one blow mandrel station and the other member with the other station. Of course, it is also possible to provide separate compressed-air-feeding auxiliary members for each mold cavity of the blow mold.

According to another alternative embodiment, the movements of the blow mandrel are limited to translational motions in the direction of the mold axis, whereby the locking station is arranged vertically over the preforming station, and the mandrel is movable from the preforming station into the locking station, and whereby the locking station is laterally movable from the direction of alignment with the preforming station, so that it may be conveyed to a compressed-air-feeding member which likewise lies laterally of the above-named direction of alignment.

According to a third embodiment of the invention, the preforming station consists of an extruder which first injects the thermoplastic material through a circular slot nozzle into a head that is equipped with a central blow mandrel. Then, by means of movement of the extruder slot nozzle relative to the head, it provides it with a tubular blank, which extends over the end of the central blow mandrel in the head to whatever length is desired. This third embodiment may be used in connection with the first-named embodiment, as well as in connection with the second embodiment, or it may be used independently of these two embodiments; it is merely necessary to ensure that, after removal of the head with the central mandrel part, a compressed-air-feeding member may readily be moved over the opening in the blow mold.

According to a fourth embodiment of the present invention, the expansion of the blank is not completed until it abuts the walls of the mold cavity, but only up to the free blowing of the mandrel, whereas the compressed-air-feeding auxiliary member completes the final shaping of the blank and fully molds the only partly-inflated hollow body and holds it in the expanded position until its progressive cooling permits the ejection of the hollow body. This embodiment is especially indicated if it is desirable to have a certain time lag between the removal of the blow mandrel and admission of the other compressed-air-feeding member in order that the preblown hollow body, after a certain cooling period, is finally expanded with a stretch effect to the walls of the mold cavity. The residual cooling period would then have to be quite prolonged, so that the advantage of the invention will become still more noticeable than on the other applications, because for the last procedural phase only the simple, compressed-air-feeding auxiliarly members need to be employed.

BRIEF DESCRIPTION OF THE DRAWINGS

The character of the invention, however, may be best understood by reference to one of its structural forms, as illustrated by the accompanying drawings, in which:

FIGS. 1-4 illustrate the work cycle of an apparatus constructed in accordance with a first example of the invention, FIG. 5 is schematic view of an apparatus for the actuation of the apparatus according to FIGS. 1-4, FIGS. 7a, 7b, 8a, and 8b are sectional views of successive work stages of the work cycle of a third embodiment of the invention, FIG. 9 illustrates a fourth embodiment of the invention similar to that of FIG. 6, FIGS. 10a and 10b represent an exemplified embodiment of the invention where the expanding process occurs in two stages.

DESCRIPTION OF THE PREFERRED EMBODIMENT

Figure 6:
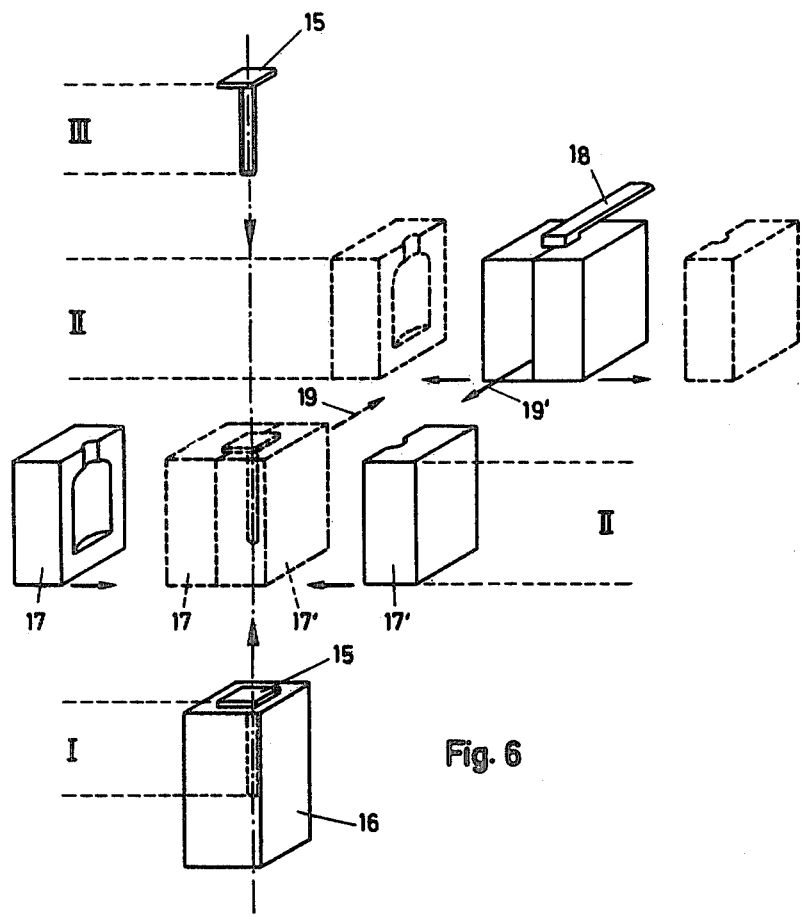
FIG. 6 illustrates schematically a second exemplified embodiment of the invention.

Referring first to FIGS. 1-4, which illustrate schematically a part of the work cycle, the blow station, preforming station, and the other associated component parts are shown in a simplified manner. By means of a beam 1 the blow mandrel pairs 2, 2' and 3, 3' are rigidly connected with one another. The beam 1 which is jointly slidable with the mandrels as well as raisable and depressable is shifted from the one lateral limiting position, illustrated in FIGS. 1 and 2, into the other lateral limiting position, which is illustrated in FIGS. 3 and 4.

In the operational stage illustrated in FIG. 1 the two mandrels 3 and 3' are in preforming station, which consists in this embodiment of two tip-stretch stations 4 and 4', while the mandrel pair 2, 2' has moved along into the blow station 5, which consists of a blow mold with the two mold cavities 5a and 5b. The blanks are blown out in the mold cavities 5a and 5b and then contact the mold pocket walls, which have not been depicted in detail. In the blow station 6, which is provided with corresponding mold cavities 6a and 6b, a compressed-air-feeding member 7 is meanwhile being pushed over the opening of the hollow body in the mold cavities 6a and 6b. The supply of compressed air through the member 7' ensures that the cooling of the hollow body will proceed while the proper pressure is maintained. Also, the member 7' has a number of openings which correspond to the number of mold cavities per blow station, i.e., in this embodiment it has two openings, which are moved over the openings of the mold cavities 6a and 6b of the blow mold that has been moved into the blow station.

After completion of the molding process, the beam 1 with the two blow mold sets is removed from the preforming station 4, 4' and from the first blow station 5. As is further evident in FIG. 2, immediately another compressed-air-feeding member 7 is pressed with its openings over the openings in the mold cavities 5a and 5b of the mold located in the blow station 5, so that in the interior of the inflated hollow body the pressure is maintained despite removal of the blow mandrel until the final solidification of the hollow body.

Subsequently, the beam 1 is shifted, as is shown in FIG. 3, in such a way that the mandrel pair 2, 2' now lies over the tip-stretch station 4, 4', whereas the mandrels 3, 3' provided with a blank lie above the blow station 6. The blank that has been applied to the blow mandrels 3, 3' is indicated as the fully drawn layer 8.

FIG. 4 illustrates the manner in which the blow mandrels have been moved from the position shown in FIG. 3 into the preforming station 4, 4' and the blow station. The work cycle is then repeated in the reverse direction from the position of the apparatus shown in FIG. 4, that is to say, rearwardly until the position shown in FIG. 1 is again reached, whereby one full period of the operating cycle has been completed.

FIG. 5 shows the attachment or a beam 1 developed as a carriage in a counter-support mounted on a bar 8 which is actuated by means of a cylinder-piston system 10. The shifting of the beam 1 in the counter-support may be effected by hydraulic, pneumatic, or mechanical means. Compressed air for the blow mandrel sets 2, 2', and 3, 3' is supplied through the tubes 11 and 12 as soon as the work cycle triggers the expansion of the blank in the blow station. The counter-support is slidably supported by columns 13 which are connected with one another through a rigid crossbeam 13' and are mounted on the machine frame 15.

Of course, instead of a mandrel pair, it is also possible to use a single mandrel, so that in the simplest case one blow mandrel is arranged at each end of a slide rail. On the other hand, any other multiple set of blow mandrels may be provided instead of a set of pairs. The number of the tipstretch pockets of the preforming stations and the number of the mold cavities of the locking devices 5 and 6 must in agreement. Instead of mandrels with two or three mold cavities, there may, naturally, be provided also two or three separate blow stations, whose locking and opening movements naturally have to be simultaneously controlled, so that the term "blow station" in the above and the following text also stands for a plurality of stations. The same applies to the tip-stretching pockets of the preforming stations, which may be replaced by a corresponding plurality of individual preforming stations. Transfer press stations, immersion blow stations, or other preforming stations which furnish blanks may be used as preforming stations.

A particularly simple arrangement is the result of another embodiment variant, which is schematically illustrated in FIG. 6. In the interests of simplicity the guides and the drive of the mandrel 15 have not been depicted. Important to this embodiment is the fact that the mandrel 15 executes motions only in its axial direction, which makes it possible to obtain a particularly well-defined guidance with the simplest means. In the lower position (shown as I) the blow mandrel 15 is located in the preforming station 16, from which it is moved into the intermediate position II, while the mold parts of the blow mold 17, 17' are open. After closing the parts 17, 17' in the blow station and after the hollow body has been blown up, the mandrel 15 is moved into upper position III, which in the axial direction (indicated by a broken line) lies exactly above the position shown in II. Immediately after the removal of the mandrel 15 from the blow mold 17, 17' in the blowing station II, it is laterally moved (illustrated by arrow 19) until it is positioned under the compressed-air-feeding member 18, which, by feeding compressed air into the interior of the inflated hollow body, prevents shrinking during cooling as a result of the memory effect. After the lateral removal of the blow mold, the mandrel 15 is again lowered from the lower position III into the raised position I in the axial direction, so that a new blank may be formed on it. After the conclusion of the cooling process and after the ejection of the hollow body (in the laterally moved position of the blow mold) this mold (remaining in opened position) is then moved back parallel to the direction of arrow 19' into the full-lined starting position. In order to lock itself subsequently around the mandrel in position II after this, it again takes up the position II with the blank. In the interest of simplicity, the drive and the guidance of the mandrel 15 have not been depicted. It is, however, readily obvious that the arrangement constructed in accordance with this exemplified embodiment provides for a particularly precise and simple guidance system.

In FIGS. 7a, 7b and 8a, 8b is illustrated an embodiment of the invention wherein the blank is produced by means of a common extrusion method. The orifice of the hollow body, e.g., the neck of a bottle, is formed by placing a head 22 with a muzzle tool 25 on the ring nozzle 4a of a schematically-indicated extruder. Nozzle 4a includes an annular slot 4a through which thermoplastic material is extruded and from which it is injected into the cavity between the mandrel 22a and the muzzle tool 25 until the bottle neck cavity is filled and in order then to form a tube 20 after the tool 25 forms the bottle neck has been withdrawn. In the case of such known methods for making blanks, after the stretching of the tube 20, the blow mold is moved in between the stationary ring nozzle of the extruder and the head which contains the bottle neck and the blow mandrel, and it severs thereby the tube, which is then expanded on the blow mandrel located in the head. The injection molding of the orifice and the extrusion of the blank is interrupted during the period of blowing and cooling of the inflated hollow body, so that the expensive tools for injection and extrusion are tied up for the greater part of the total work cycle. Now, the embodiment according to the invention results in an elimination of these drawbacks and a saving in tools in that, after the tube 20 has been stretched, this tube is cut off by a shear 21 and is then moved into a folded-up position together with the head 22 into the position shown in FIG. 7b, as is indicated by the arrow 23. FIG. 7b shows the blow mold 24, 24' as already in the moved-in position after the shear 21 has been retracted. After the tube 20 has been inflated, the head 22 is then withdrawn in the direction of the arrow 23 and moved from the blow mold into the position shown in FIG. 7a for the expanding process. It is subsequently moved into the position shown in FIG. 8a for the forming of a new blank after the divided muzzle tool 25 that is assigned to the head has again been moved back to the head 22, as illustrated in FIG. 8a.

The muzzle tool 25 for the bottle neck may be opened in different ways; in the illustrated embodiment this is preferably accomplished by the fact that the double-jawed tool, whose plane of separation lies in the plane of the drawing, is moved apart perpendicular to the drawing plane, so that the head 22 with the mandrel 22a may be readily transferred into the position shown in FIG. 7b, which in the drawing plane is laterally offset to the position of FIG. 7a. After the head 22 with its associated blow mandrel 22a has been withdrawn, the compressed-air-feeding member 26 is then introduced as illustrated in FIG. 8b. The compressed-air-feeding member shown has the shape of a spherical segment that stands with its end face resting on the topside of the mold halves.

FIG. 9 relates to a variant which essentially corresponds to the embodiment of FIG. 6, whereby the blow mandrel may be moved along its axis into three different positions. In position I the head 32 with the muzzle tool 25 stands directly on the ring nozzle 4'' of the extruder, whereby the ring nozzle is in alignment with the cavity between tool 25 and a blow mandrel 22a from which the orifice is being formed (this is not depicted in detail and corresponds essentially to FIG. 8a). From this position the head 22 with the muzzle tool 25 is then moved in the known manner into the position shown in FIG. 9, whereby a blank in the shape of a tube 20 is extruded. Subsequently, the tool 25, as is indicated by the arrows 27, is then moved into an upper position, so that the two mold halves 28, 28' may be closed around the blank. After the subsequent preliminary inflating of the blank, the head 22 with the blow mandrel 22a is withdrawn from the mold and the mold is moved outwardly into a position that is laterally displaced to the axis of the blow mandrel, in which position it arrives under another compressed-air-feeding member 18 (see FIG. 6).

Although in the interests of simplicity no muzzle tools have been depicted on the embodiments of FIGS. 1 to 6, it is obvious that muzzle tools of the kind illustrated in FIGS. 8 and 9 can or must be used also on these embodiments.

The muzzle tool may be used in different variations. Thus, the muzzle tool may already be open before blowing begins. The neck part of the bottle is in such case already enveloped by the muzzle jaws while the mold is closing.

If the muzzle tools are kept closed during the preinflating of the blank through the blow mandrel, then the muzzle tools on the mold are first withdrawn. Then may be combined with the compressed-air-feeding member that is constructed as a bottle pusher.

Figures 10A, 10B:
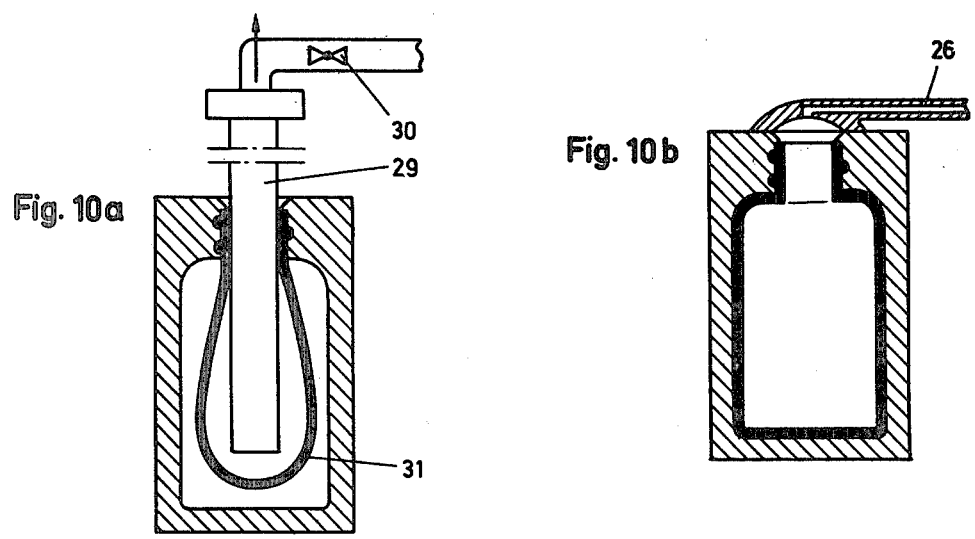

If the mouth of the bottle has no undercutting, then possibly also an unsplit muzzle tool in the station may suffice. FIGS. 10a and 10b illustrate a device by means of which a special type of expanding process may be performed. For this purpose, there is first introduced a blow mandrel 29 into the blow mold depicted in FIG. 10a and (through adjustment of the pressure and/or the amount of compressed air by means of a controlled valve 30) the blank 31 is blown from the blow mandrel without quite reaching the wall of the mold cavity of the blow mold. In a second procedural step (which is depicted in FIG. 10b) the blank is blown through another compressed-air-feeding member 26 against the walls of the mold pocket, whereby (through selection of the time gradation between the withdrawal of the actual blow mandrel and the application of the compressed-air-feeding member) the hollow body may undergo a process of stretching, which, after a sufficient cooling period, may lead to a deformation. If the other compressed-air-feeding member has a rod-like shape (similar to the shape of the blow mandrel, of course, without this member serving for preforming processes so that it may therefore be machined without precision), then it may in the case of a cold deformation be introduced into the mold during the operation of the stretching process, e.g., in agreement with the course of the stretching process.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for forming a hollow body of thermoplastic material, which body is symmetrical and has a threaded neck, comprising:
   (a) a machine frame,
   (b) a blow mandrel having a central longitudinal axis and being mounted on said machine frame for movement along said axis and for movement laterally of said axis between a first position and a second position,
   (c) a preforming station mounted on said frame spaced from and in axial alignment with said blow mandrel when it is in said first position, said station including means for applying a preform body of soft thermoplastic material to a blow mandrel within the station,
   (d) means for moving said blow mandrel along said axis from said first position into said preforming station for application of a preform body of thermoplastic material and out of said preforming station back to said first position with the preform body attached to said mandrel and extending from said preforming station,
   (e) a two-part muzzle tool, the parts of said muzzle tool being individually movable laterally of said axis from a first position in which said parts are spaced and located on opposite sides of said mandrel to a second position in which said parts are united about said mandrel for cooperating with said mandrel to form a head which is effective to form a threaded neck of a preform body of thermoplastic material on said mandrel, the parts of said muzzle tool being movable with said mandrel along said axis to said first position,
   (f) severing means located between said preforming station and said blow mandrel when it is spaced from said preforming station for severing a preform body of thermoplastic material extending from said mandrel to said preforming station,
   (g) means for moving said mandrel with the preform body from said first position to said second position,
   (h) a molding station comprising a split mold mounted on said frame and spaced from said preforming station for receiving said mandrel with the preform body in said second position, said split mold having interior surfaces which form a cavity, means for moving the portions of said split mold together, said molding station including means for applying compressed air to the blow mandrel for expanding the preform body into conformity with the surfaces forming said cavity, thereby forming a hollow body of thermoplastic material,
   (i) means for removing said blow mandrel axially from said molding station, thereby leaving the body of thermoplastic material in said split mold, and
   (j) a compressed air-feeding member, including means for attachment over said split mold, said member serving to supply retaining and cooling air into the interior of a hollow body of thermoplastic material with said split mold.

2. Apparatus as recited in claim 1, wherein said preforming station comprises an extruder having a nozzle with an annular slot through which the thermoplastic material is injected into said head and wherein relative motion between said head and said extruder along the central longitudinal axis of said mandrel causes the preform body of thermoplastic material extending between said mandrel and said preforming station to be tubular.

3. Apparatus as recited in claim 1, wherein said serving means forms part of said split which is movable from said first position to said molding station together with said blow mandrel, wherein the extending portion of said preform body is severed at said first position.

* * * * *